United States Patent [19]

Degand

[11] Patent Number: 5,503,353
[45] Date of Patent: Apr. 2, 1996

[54] TUBE ANCHOR WITH TABS

[75] Inventor: Leonard G. Degand, Palatine, Ill.

[73] Assignee: Adler-Norco, Inc., North Chicago, Ill.

[21] Appl. No.: 347,708

[22] Filed: Dec. 1, 1994

[51] Int. Cl.⁶ .................................................. F16L 3/00
[52] U.S. Cl. ........................ 248/50; 174/138 H; 248/601
[58] Field of Search ................... 248/50, 74.2, 601, 248/49; 174/138 H, 138 R

[56] References Cited

U.S. PATENT DOCUMENTS

| | | | |
|---|---|---|---|
| 1,704,472 | 3/1929 | Grandjean | 248/50 |
| 1,792,611 | 2/1931 | Staaf, Jr. | |
| 1,814,831 | 7/1931 | Covey | 174/138 H |
| 1,820,838 | 8/1931 | Smalley | 248/50 |
| 1,998,296 | 4/1935 | Walker | 248/50 |
| 2,050,559 | 8/1936 | Budnick | |
| 2,335,296 | 11/1943 | Miller | 248/50 |
| 2,744,705 | 5/1956 | Richter | 248/50 |
| 2,850,560 | 9/1958 | Heyob et al. | 248/50 X |
| 3,011,744 | 12/1961 | Morgan, Jr. | |
| 3,135,488 | 6/1964 | Leonard | |
| 3,905,570 | 9/1975 | Nieuwveld | |
| 4,566,660 | 1/1986 | Anscher et al. | |
| 4,666,109 | 5/1987 | Fallon et al. | 248/50 |
| 5,108,054 | 4/1992 | Degand | 248/50 |
| 5,257,762 | 11/1993 | Trame et al. | 248/74.2 X |

*Primary Examiner*—Karen J. Chotkowski
*Attorney, Agent, or Firm*—Emrich & Dithmar

[57] ABSTRACT

The anchor comprises a tubular plastic post having an abutment at one end and a mounting element at the other end. In the post is a pair of deflectable integral tabs that are substantially parallel. Each tab has a shoulder. A spring is disposed in the base between the abutment and the shoulders. The spring is inserted by deflecting the tabs outwardly until the spring passes the shoulders, whereupon the tabs snap back to a position precluding retrograde movement of the spring.

12 Claims, 2 Drawing Sheets

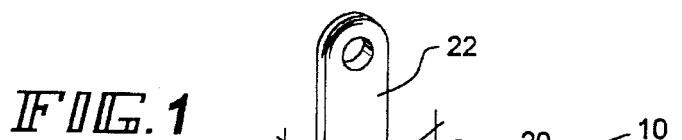
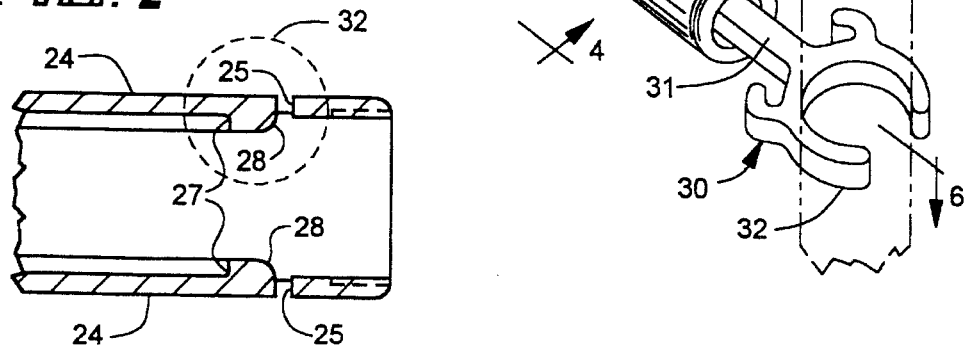
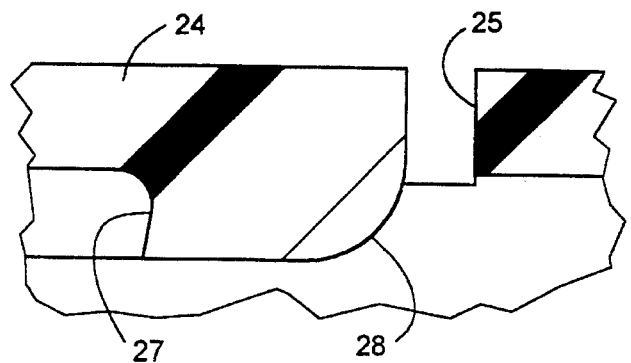
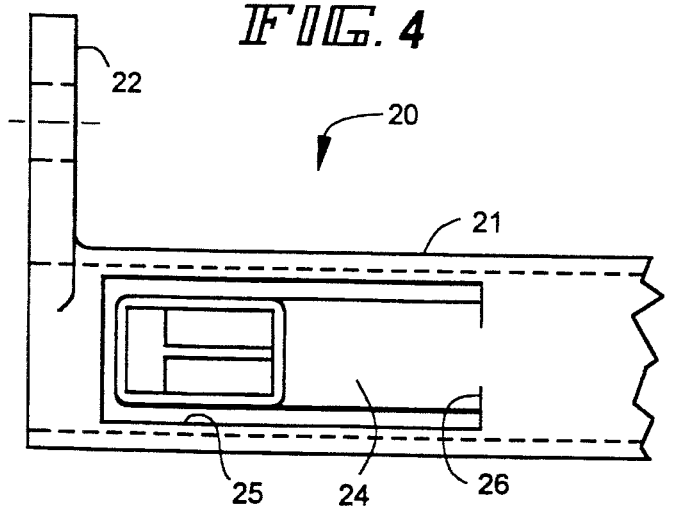
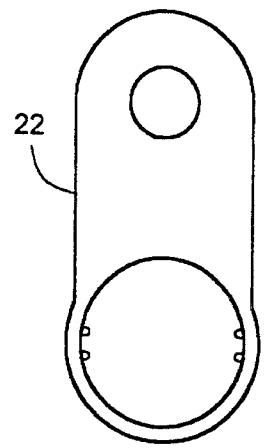

TUBE ANCHOR WITH TABS

BACKGROUND OF THE INVENTION

This invention relates generally to an anchor for neon tubing and the like. Luminous signs of the neon-tube type are comprised of a frame upon which is mounted glass tubing bent into a particular shape. The glass tubing is supported in spaced relation on the frame by a plurality of anchors secured to and extending outwardly from the frame.

U.S. Pat. No. 5,108,054, assigned to the assignee of the present application, discloses a tube anchor that is currently in the marketplace. The stem, which has a saddle to receive the neon tube, is interconnected with a spring sliding in a metal tube. While this product is commercially successful, it does suffer some disadvantages. In assembling the anchor, shoulders at one end of the metal tube are struck therefrom. Then, the other end is deformed to capture the spring. This has proven to require more labor than desired to make and to assemble the anchor.

SUMMARY OF THE INVENTION

It is therefore an important object of the present invention to provide an improved tube anchor which is easier and less expensive to assemble.

Another object is to provide such a tube anchor in which the base is formed of plastic or the like instead of metal.

In summary, there is provided an anchor for supporting a neon tube and the like comprising, a generally tubular post having first and second ends, an abutment near the first end, at least one deflectable tab integral with the post near the second end, the tab having a shoulder, a spring disposed in the post between the abutment and the shoulder, and a stem extending into the spring and secured thereto, the stem carrying a saddle protruding from the post, the saddle being constructed and arranged to snappingly receive a neon tube.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is perspective view of a tube anchor constructed in accordance with the features of the present invention;

FIG. 2 is an enlarged view in vertical section taken along the line 2—2 of the plastic tubular body without the spring or stem in position, of FIG. 1;

FIG. 3 is an enlarged view of the structure in the circle marked "3" in FIG. 2;

FIG. 4 is an elevational view taken along the line 4—4 of FIG. 1;

FIG. 5 is a bottom plane view of the tube anchor;

DESCRIPTION OF THE PREFERRED EMBODIMENT

Figure 6:
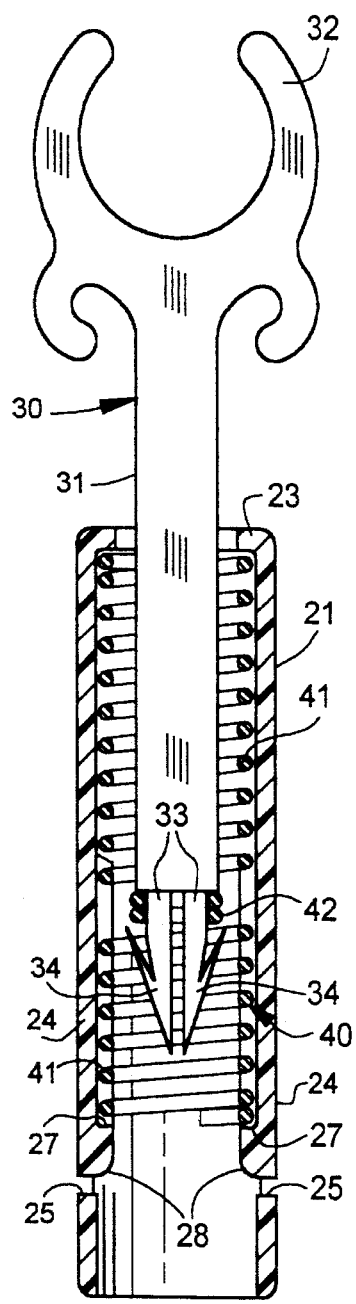
FIG. 6 is an enlarged view in section taken along the line 6—6 of FIG. 1.

Turning now to the drawings, and more particularly to FIG. 1 thereof, there is depicted a tube anchor 10 constructed in accordance with the present invention. Anchor 10 is adapted and constructed to support glass tubing 11 (neon) for example, in spaced relation from a support frame (not shown). Anchor 10 includes a one-piece base 20 and a stem 30. A C-shaped saddle 32 at one end of stem 30 snappingly receives tubing 11. Base 20 is preferably molded of plastic to form a hollow post 21 and a flange 22. A screw or bolt extends through a hole in flange 22 for fastening anchor 10 to the support frame. A plurality of these anchors would be fastened to the support frame at locations determined by the shape of tubing 11.

Stem 30 is preferably made of high-strength plastic and has a shaft 31 and a saddle 32 at one end thereof. The recess in saddle 32 has a diameter generally equal to the diameter of tubing 11 for snappingly receiving and securing same.

Integral with post 21 is two tabs 24 which in the embodiment shown, are flat and lies in generally parallel planes. Tabs 24 are respectively located in openings 25 formed in such side wall. Openings 25 and tabs 24 are generally of the same elongated rectangular shape, except that the latter are slightly smaller. Each tab 24 extends from end 26 of opening 25 and is generally pivotable there at. Referring to FIGS. 2 and 3, at the free end of each tab 24 is an enlarged portion defining a shoulder 27 that faces flange 22. The outer end of each tab defines a curved camming surface 28.

Referring to FIG. 6, stem 30 includes bifurcated legs 33 which extend longitudinally outwardly from the other end of shaft 31 and which are resiliently carried thereby to allow movement toward each other. Two barbs 34 extend outwardly respectively from legs 33, and resiliently carried thereby to allow them to be flexed toward such legs. Further details of stem 30 may be had by referring to U.S. Pat. No. 5,108,054. Anchor 10 further comprises a metal spring 40 including two end portions 41 and an intermediate portion 42 therebetween. Each end portion 41 has a diameter greater than the diameter of the intermediate portion 42.

Figure 7:
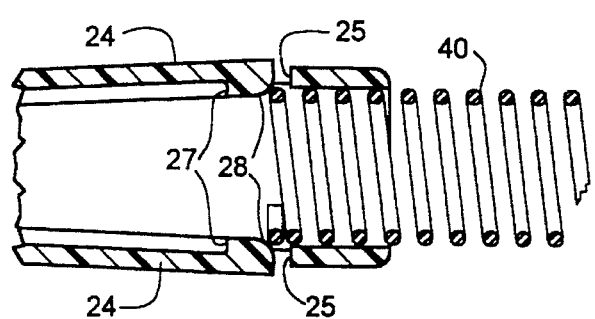
FIG. 7 depicts a fragmentary portion of the post and spring, showing the two in an initial stage of assembly.
Figure 8:
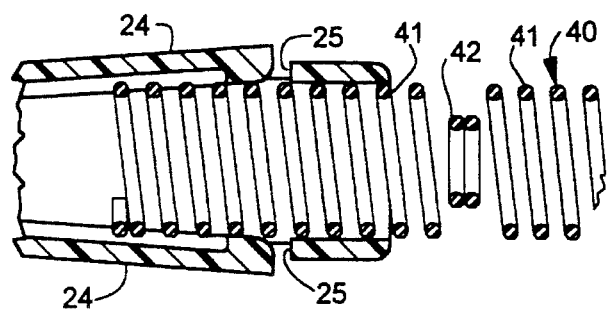
FIG. 8 depicts a fragmentary portion of the post and spring, showing the two in an intermediate stage of assembly.
Figure 9:
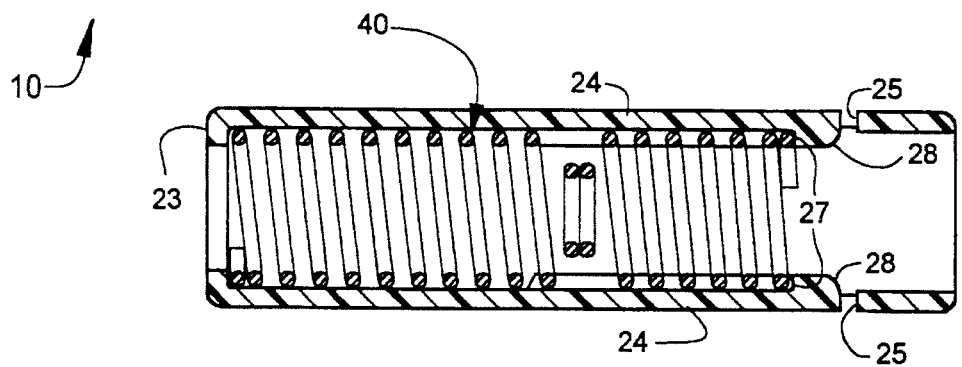
FIG. 9 depicts a fragmentary portion of the post and spring, showing the two in a final stage of assembly.

During assembly, as depicted in FIGS. 7–9, spring 40 is aligned with the open end of post 21, that is, the end farthest from flange 22. Spring 40 is inserted, as depicted in FIG. 7, until it contacts camming surfaces 28. Pushing against the free end of spring 40 causes tabs 24 to deflect outwardly, permitting continued insertion of spring 40, as depicted in FIG. 8. The spring is fully inserted as soon as it passes the free end of each tab 24, wherefor tabs return to their undeflected position, as depicted in FIG. 9. Spring 40 is thereby constrained between flange 22 and shoulders 27, as shown in FIG. 9.

Stem 30 is pushed through spring 40. Barbs 34 are deflected toward each other by portion 42. After barbs 34 have passed through portion 42, they snap back to the position shown in FIG. 6, thereby precluding retrograde movement of stem 30. Stem 30 is thus secured in post 21.

It is believed that the invention, its mode of construction and assembly, and many of its advantages should be readily understood from the foregoing without further description, and it should also be manifest that, while the preferred embodiment of the invention has been shown and described for illustrative purposes, structural details are, nevertheless, capable of wide variation within the per view of the invention as described in the appended claims.

What is claimed is:

1. An anchor for supporting a neon tube and the like comprising a generally tubular post having first and second ends, an abutment near said first end, at least one deflectable tab integral with said post near said second end, the tab having a shoulder, a spring disposed in said post between said abutment and said shoulder, and a stem extending into said spring and secured thereto, said stem carrying a saddle protruding from said post, said saddle being constructed and arranged to snappingly receive a neon tube.

2. The anchor of claim 1, wherein said post has an elongated opening, said tab having a shape substantially matching the shape of said opening and being slightly smaller than opening, said tab extending from one end of said opening.

3. The anchor of claim 2, wherein said opening and said tab are generally rectangular.

4. The anchor of claim 1, further comprising means at one end of said post for fastening said post to a frame.

5. The anchor of claim 4, wherein said means is located at said second end.

6. The anchor of claim 1, and further comprising a deflectable second tab integral with said body and near said second end, said spring being disposed between said abutment and said shoulders.

7. The anchor of claim 6, said second tab has a shoulder.

8. The anchor of claim 6, wherein said tabs are on opposite sides of said base.

9. The anchor of claim 6, wherein said tabs respectively have camming surfaces engaged by the end of the spring during installation thereof to cause said tabs to deflect outwardly and enable the spring to pass said shoulders, said tabs being returnable against the adjacent end of said spring.

10. The anchor of claim 6, wherein said tabs are substantially flat and lie in substantially parallel planes.

11. The anchor of claim 1, wherein said tab has a camming surface engaged by the end of the spring during installation thereof to cause said tab to deflect outwardly and enable the spring to pass said shoulder, said tab being returnable against the adjacent end of said spring.

12. The anchor of claim 1, wherein said stem includes a shaft and a saddle, the saddle being at one end of said shaft and, a pair of legs at the other end of said shaft, and a pair of bars extending outwardly respectively from said legs, said barbs engaging said spring.

* * * * *